(12) United States Patent
Maus et al.

(10) Patent No.: US 10,032,162 B2
(45) Date of Patent: Jul. 24, 2018

(54) MULTI-PURPOSE DATA STORAGE KEY

(71) Applicants: Christopher Maus, Sandpoint, ID (US); Brandon Maus, Sandpoint, ID (US)

(72) Inventors: Christopher Maus, Sandpoint, ID (US); Brandon Maus, Sandpoint, ID (US)

(73) Assignee: uQontrol, Inc., Sandpoint, ID (US)

( * ) Notice: Subject to any disclaimer, the term of this patent is extended or adjusted under 35 U.S.C. 154(b) by 490 days.

(21) Appl. No.: 14/744,812

(22) Filed: Jun. 19, 2015

(65) Prior Publication Data

US 2016/0371683 A1  Dec. 22, 2016

(51) Int. Cl.
*G06Q 20/38* (2012.01)
*H04L 29/06* (2006.01)
*G06Q 20/40* (2012.01)

(52) U.S. Cl.
CPC ....... *G06Q 20/3829* (2013.01); *G06Q 20/385* (2013.01); *G06Q 20/405* (2013.01); *H04L 63/0838* (2013.01); *H04L 63/0853* (2013.01); *H04L 2463/102* (2013.01)

(58) Field of Classification Search
CPC .................................................. G06Q 20/341
USPC .......................................................... 705/16
See application file for complete search history.

(56) References Cited

U.S. PATENT DOCUMENTS

| | | | |
|---|---|---|---|
| 2003/0087601 A1 | 5/2003 | Agam et al. | |
| 2009/0066478 A1 | 3/2009 | Colella | |
| 2009/0203355 A1* | 8/2009 | Clark | G06F 21/32 455/411 |
| 2009/0241182 A1* | 9/2009 | Jaber | G06F 21/31 726/16 |
| 2010/0274677 A1* | 10/2010 | Florek | G06Q 20/10 705/16 |
| 2012/0278614 A1 | 11/2012 | Choi | |

OTHER PUBLICATIONS

PCT/US2015/011260 International Search Report.

* cited by examiner

*Primary Examiner* — Edward Chang
(74) *Attorney, Agent, or Firm* — Mehrman Law Office; Michael J. Mehrman

(57) ABSTRACT

A secure non-volatile solid state memory data key appears similar to a conventional USB flash drive modified to have a physical shape resembling a door key with an eyelet for attaching the data key to a key ring or lanyard. The data key includes a USB port, a microprocessor (effectively serving as the "chip" in the chip-and-pin configuration), and a secure memory for holding secure transaction information, such as credit and debit card numbers, verified personal identification (federated ID), and other secure data. The data key may include a dual-purpose electrical contact that serves both as a four-pin USB contact and an eight-pin chip-and-pin contact. Another example is a data key with a near-field communication (NFC) receiver that allows to data key to turn a smartphone, laptop or other computer into an NFC merchant terminal.

20 Claims, 16 Drawing Sheets

MULTI-PURPOSE DATA STORAGE KEY

PRIORITY CLAIM TO RELATED APPLICATION

This application claims priority to commonly-owned U.S. Provisional Patent Application Ser. No. 61/926,437 entitled "QKEY MOBILE PIN PAD EMULATOR" filed on Jan. 13, 2014; U.S. Design patent application Ser. No. 29/514,527 entitled "UNIVERSAL SERIAL BUS DATA KEY" filed Jan. 13, 2015; and U.S. patent application Ser. No. 14/596,089 entitled DATA STORAGE KEY FOR SECURE ONLINE filed Jan. 13, 2015, which are incorporated by reference.

TECHNICAL FIELD

The present invention relates to the field of security devices for online transactions and, more particularly, to a portable data storage key and associated online transaction systems configured for use in conducting secure online and offline financial and other data transactions.

BACKGROUND

Large scale credit and debit card security breaches have highlighted the need for improved data security for financial transactions and other types of digital access control. Europe has implemented "chip-and-pin" (Euro/MasterCard/VISA "EMV") financial account cards to improve security for in-store transactions where the chip-and-pin card is physically present at the point of sale. The United States is currently in the process of converting to the chip-and-pin (EMV) standard to obtain the same type of security improvement in this country. At present, however, chip-and-pin technology only provides improved security for transactions when the chip-and-pin card is physically preset to be processed by a point-of-sale chip-and-pin card reader. Because chip-and-pin readers are generally not available at the homes of individuals and other locations used to conduct online commerce, chip-and-pin technology will not improve the security online transactions, which are the most vulnerable type of transaction. During the online transaction process, sensitive personal and financial transaction data is vulnerable to hijacking when stored in browser cookies and other storage locations on the host computer. The data is also vulnerable to hackers when sent from the host computer used by the online consumer to the web account and payment gateway of the merchant processing the online transactions. This data is often encrypted when it reaches a secure website (e.g., https), but is may not be encrypted on the data initial link from the host computer to the secure site.

This initial data link presents a number of points vulnerable to hackers during online commerce transactions including, among others, keystroke monitoring when personal data and financial card data is entered into the host computer, browser cookies storing the consumer's personal data and financial card data, and storage of this and other personal data on the webserver of the online merchant. One approach to providing chip-and-pin type security for online purchases would be to provide individual consumers with chip-and-pin readers to utilize as part of their personal computer equipment. But this would be extremely expensive, however, and at least partially ineffective because consumers are unlikely to have their own chip-and-pin terminal with them everywhere they want to conduct online commerce in the increasingly mobile computing environment. In addition, chip-and-pin terminals are presently limited to merchant accounts which require payment of monthly fees that few individual consumers would be willing to pay. Issuing a large number of chip-and-pin terminals to end-use consumers would also blur the distinction between merchants and consumers and impose multiple layers of transaction processing that the financial transaction infrastructure is not presently configured to accommodate.

There is, therefore, a need for a convenient and effective mechanism for securing online transactions. More specifically, there is a need for cost effective mechanisms for providing chip-and-pin type security for online transactions without requiring major changes to the financial transaction infrastructure.

SUMMARY OF THE INVENTION

The present invention meets the needs described above in a secure non-volatile solid state memory data key, such as a USB flash memory key, and associated system conducting secure online transactions. Embodiments of the data key may include a number of different features and operate in a number of different manners described in the figures and text of this disclosure. These features and operating modes need not all be present in any particular embodiment, and various combinations may be implemented particular alternative embodiments. Each feature and operating mode described in the disclosure should therefore be considered an option with only the granted claims serving to specify the elements of a particular patented invention.

In general, a particular embodiment of the data key appears similar to a conventional USB flash drive modified to have a physical shape resembling a door key with an eyelet for attaching the data key to a key ring or lanyard. The data key includes a USB port, a microprocessor (effectively serving as the "chip" in the chip-and-pin configuration), and a secure memory for holding secure transaction information, such as credit and debit card numbers, verified personal identification (federated ID), and other secure data. A biometric sensor (e.g., touch sensor or "capcha") verifies that a person is in physical possession of the data key before permitting access to the secure memory. Information and logic resident on the microprocessor is necessary to decrypt the information maintained in the secure memory rendering the data in the secure memory inaccessible (and useless if it was accessed) without proper operation of the microprocessor, entry of a master password, and activation of the touch. The touch sensor may be limited to use by a unique individual person through a biometric reader, such as a finger print reader, where the verification finger print is stored on the key rather than the connected host device.

Different multi-purpose embodiments may perform different functions in a wide range of combinations. Particular examples include a data key with a dual-purpose electrical contact that serves both as a four-pin USB contact and an eight-pin chip-and-pin contact. Another example is a data key with a near-field communication (NFC) receiver that allows to data key to turn a smartphone, laptop or other computer into an NFC merchant terminal. In other examples the data key provides access to multiple tangible and intangible assets and other features, such as financial accounts, merchant accounts, building access, vehicle access, computer access, equipment access, firearm access, security credentials, location monitoring, exercise monitoring health monitoring, and so forth.

The specific techniques and structures for implementing particular embodiments of the invention, and thereby accomplishing the advantages described above, will become apparent from the following detailed description of the embodiments and the appended drawings and claims.

DETAILED DESCRIPTION OF THE EMBODIMENTS

Figure 1A:
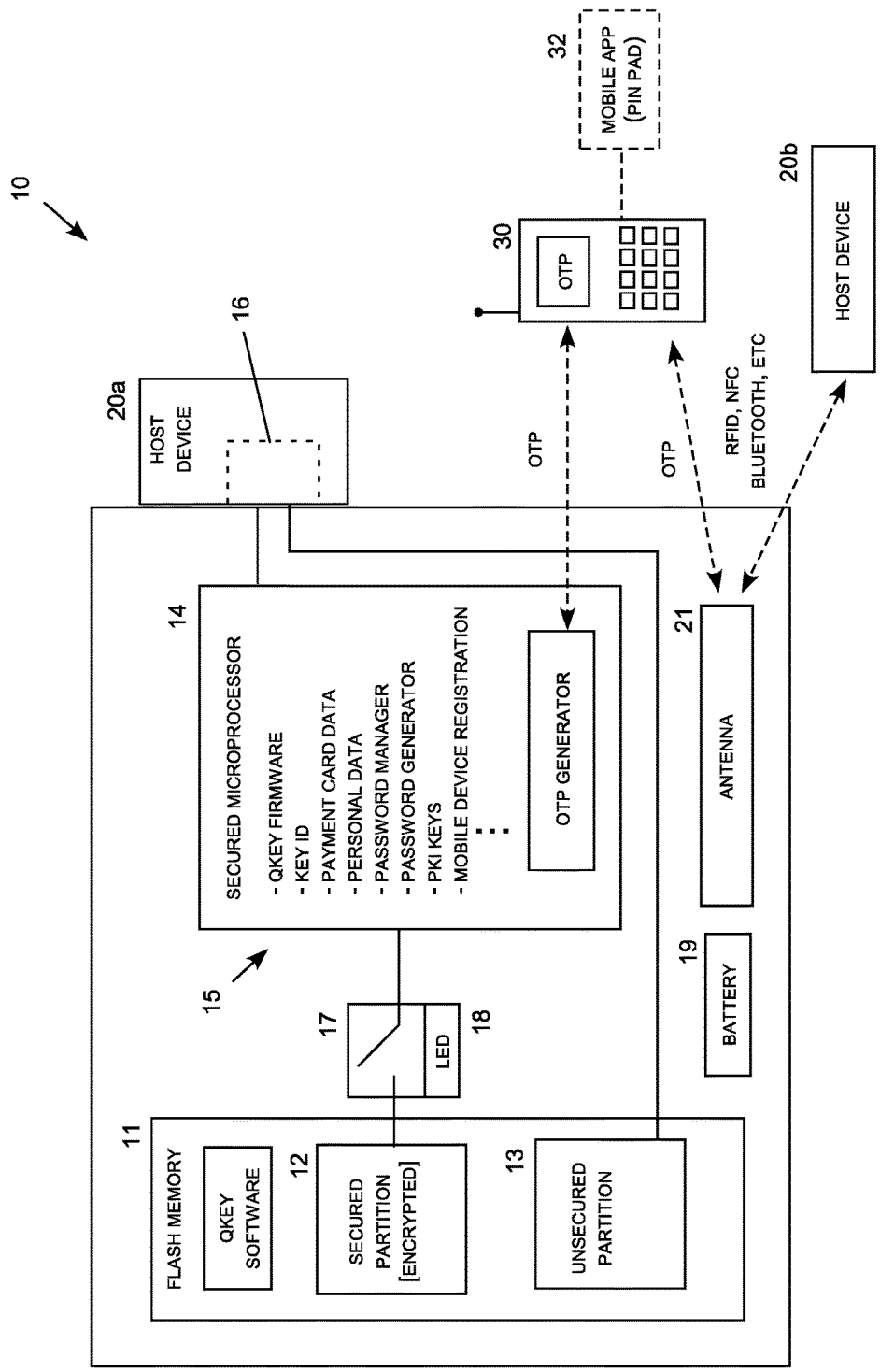
FIG. 1A is a block diagram of an example portable data storage key and associated system for conducting secure online transactions.

Embodiments of the invention may be realized in a non-volatile solid state memory data key, such as a USB flash memory key, and associated methods and systems for providing secure online transactions. In this context, website account access and online transactions include financial transactions, such as credit and debit card purchases, as well as other types of data transactions which are secured and control by the key. For example, network access to secure data files, such as business records and any other type of data stored online, fall within the meaning of online transactions. The data key may also be used to replace passwords with dynamic tokens or cryptograms traditional used in chip-and-pin payment transactions.

In a basic transaction mode, the data key transmits stored personal data (e.g., financial account holder identification information) and account numbers (e.g., credit or debit card number, expiration date, and non-embossed verification cods) to an online financial transaction processor without the user having to type that sensitive data or have it stored in browsers cookies or any other locations on the host computer used to select the item for purchase. The data key stores this sensitive information in an encrypted format and may transmit the sensitive data using encrypted or unencrypted format depending on the requirements of the receiving transaction processor. The data key is therefore backwardly compatible with conventional online transaction processors configured purchasers with magnetic strip financial cards, and forwardly compatible with transaction servers configured purchasers with chip-and-pin financial cards that communicate in the form of public key infrastructure (PKI) encrypted packets sometimes encoded by security tokens. The same security features apply to passwords, fast identity online (FIDO), bio identifiers, and all other secure data stored on the data key. It should be noted that the data key typically contains a secure data partition (which may be a physical or virtual partition) controlled by the onboard microprocessor and an unsecured partition that operates like a conventional USB flash drive.

The data key is also compatible with various security features implemented by conventional transaction servers, such as one-time-pin (OTP) and quick response (QR) pictorial codes using dual-device security. The data key may also implement nearfield communication (NFC) functionality allowing it to function as a credit or debit card with conventional "touch-and-go" point-of-service (POS) card readers. Expected features or future transaction server technology referred to generally as dynamic payment exchange or dynamic authorization is also supported. This involves the payment exchange maintaining dual-device correlations, and requiring communication with a financial account holder on two communication modes (e.g., payment terminal and mobile telephone) in order to authenticate transactions. The data key, in some cases in concert with an online server, has the ability to support existing transaction protocols and adjust to future protocols as they may be deployed in the future for enhancing both online and POS transactions. The data key may also store transaction data for multiple financial accounts (e.g. storing all of a user's credit and cards on one device), support online and POS transactions, and store non-conventional currencies (such as BITCOIN® and similar financial instruments).

The data key communicates transaction data (in encrypted or non-encrypted format as required by the receiving processor) at any point in the transaction cycle that the receiving processor is configured to accept. That is, the data key may transmit data to the payment gateway operated by a retail vendor (e.g., Amazon®), or the backend server operated by the transaction processor (e.g., VISA®), depending on the format and location accepted by the processing system. The data key has this capability because it has a built-in microprocessor, PKI encryption capability, TCP/IP and browser functionality. The data key also works in concert with, and communicates with, an online support system which allows each key to be updated with downloads, unique apps provide by third parties and supplemented with online functionality (e.g., a mobile telephone emulator) to supply any components functionality not available in a particular operating environment (e.g., where a mobile telephone or mobile telephone service is not available). The data key can therefore keep up with differences in, and changes made to, financial processing systems as well as operating environments. The following description therefore covers a wide range of options and transaction modes that need not all be in play in any particular device or transaction. Rather, major advantages achieved by virtue of the onboard microprocessor and online augmentation of the data key are effectively unlimited backward and forward compatibility with transaction processing systems, the ability to engage in virtually any type of transaction process supported a transaction processing systems, and the ability to adapt to just about any type of operating environment with at least an Internet connection and a USB port or wireless communication capability.

An illustrative data key for conducting secure transactions includes a non-volatile solid state memory, a microprocessor operative for storing encrypted data in the memory, a data port for communicating data stored in the memory between the data key and a host computer, and a touch or depression sensor configured for responding to human engagement with the sensor by temporarily activating the microprocessor for engaging in secure transactions utilizing the encrypted data stored in the memory and a host computer in operative communication with the data key. The memory, microprocessor, data port, and touch or depression sensor are configured as an integrated unit that is conveniently removable from operative connection with the host computer and portable by a computer user. The encrypted data stored in the memory comprises personal identification data associated with a registered user of the data key and transaction account data associated with the registered user of the data key.

The microprocessor may be further configured to conduct transactions using the encrypted data in the memory through a dual-device security protocol involving a mobile device registered for use with the data key. The microprocessor may be further configured to participate in the dual-device security protocol by generating an initiation one-time-password (OTP) for used in connection with a transaction, transmit the OTP to a mobile device registered to the user of the data key, receive a return OTP from the mobile device, and transmit the personal identification data and transaction account data to a transaction processor in response to detecting a match between the initiation OTP and the return OTP. In particular, the microprocessor may be further configured to generate an initiation one-time-password (OTP) for used in connection with a transaction, transmit the OTP to a mobile device registered with the data key for use with the data key. The dual-device security protocol may utilize a mobile app configured to running on the mobile device exposing a touchscreen pin pad on the mobile device for receiving user entry of the return OTP without utilization of keystrokes on the mobile device.

The data port may be a USB plug or a wireless data port. The data key may engage in the dual-device security protocol using the USB plug for establishing a first communication link with a host computer, and using a wireless data port for establishing a second communication link with a mobile device for engaging in the dual-device security protocol. The dual-device security protocol may utilize an OTP or a pictorial code generated by the data key or a transaction processor participating in the dual-device security protocol. The microprocessor may transmit data stored in the memory to a transaction processor encrypted in PKI, token, or cryptogram format.

An additional features, the memory of the data key may also include an unsecured data partition operative without operation of the microprocessor and a battery for powering the data key to engage in secure transactions through wireless communications without physical connection to another device. The data key may also include a nearfield communication (NFC) antenna operative for wirelessly communicating with an NFC point-of-sale (POS) terminal to engaging in a transaction with the POS terminal.

An illustrative system for conducting secure transactions includes a data key comprising a non-volatile solid state memory, a microprocessor operative for storing encrypted data in the memory, and a data port for communicating data stored in the memory between the data key and a host computer. The memory, microprocessor, and data port are configured as an integrated unit that is conveniently removable from operative connection with the host computer and portable by a computer user. The encrypted data stored in the memory includes personal identification data associated with a registered user of the data key and transaction account data associated with the registered user of the data key. The system also includes a mobile device registered with the data key and the microprocessor is configured to conduct transactions using the encrypted data in the memory through a dual-device security protocol involving a mobile device registered for use with the data key.

The system may also include an online server operative for participating in the dual-device security protocol by receiving transaction authorization data from the data key via a first communication medium and transmitting the transaction authorization data to the mobile device via a second communication medium. The online server may alternatively participate in the dual-device security protocol by receiving transaction authorization data from the data key via a first communication medium and transmitting transaction authorization data to a transaction server via a second communication medium. In each mode, the first communication medium may be the Internet and the second communication medium may be a telecommunications network.

FIG. 1 is a block diagram of a conveniently removable and portable data storage key 10 and associated system for conducting secure online transactions. The illustrative data storage key 10, which may be structured as a modified universal serial bus (USB) flash drive, includes a flash memory 11 that may be divided into a secured partition 12 and an unsecured partition 13. These may be a physical partitions or a virtual partitions where the secured partition refers to the storage of encrypted data and the unsecured partition refers to the storage of unencrypted data with or without fixed memory locations or sizes dedicated to the individual partitions. The secured partition 12 contains encrypted data used for secure transactions, such as (but not necessarily limited to) financial transactions. For example, the secured partition 12 may include credit card and debit card information corresponding to accounts owned by a registered holder of the data storage key 10 along with authenticated identification credentials for the holder often referred to as "federated ID" credentials and Digital ID verification. The unsecured partition 13 may be conventional flash memory that the holder of the key may utilize the unsecured partition as general purpose removable computer memory. In specific examples, the data storage key 10 may include general purpose flash memory of 5 GB or 10 GB in addition to the secured partition 12 dedicated for use in secured transactions. A relative small amount of flash memory, such as 1 MB, is typically suitable for the dedicated purpose of the secured partition 12. While flash memory is used in the illustrative embodiments, the invention is indifferent to the type of removable memory device and may be adapted to other types of non-volatile memory solid state that may become commercially available in the future (e.g., electron spin memory, magnetoelectric memory, nano-RAM memory, and so forth).

The secured memory partition 12 is connected to a secured microprocessor 14 that implements the secured transaction functionality 15 of the data key. The unsecured memory partition 13 and the secured microprocessor 14 may be (but need not necessarily be) separately connected to a data port 16. The data port may be a standard "Type A" USB data port configured to plug into USB ports typically provided on personal computers. While the "Type A" USB is expected to be the most prevalent type of data key, other types of data keys may be provided, such as the "Micro-B" USB port, the UC-EC (non-USB) port, the "Mini-B" USB port typically found on smartphones and tablet computers, and so forth. One or more physical end-type adapters that plugs into a given data key port may also be provided to allow the same data key to plug into different types of receptacles (e.g., A-to-Micro B adapter, A-to-Mini-B adapter). This may facilitate the same data key selectively plugging into a host computer and a smartphone, for example, to accommodate transactions involving both types of interfacing devices. It should also be appreciated that wireless communication (e.g., Bluetooth, NFC, RFID, etc.) between the data key and one or more of the devices may obviate the need for a physical port connection between the data key and one or more of the interfacing devices. In a particular embodiment, for example, the data key may include a "Type A" USB port for connecting to a host computer and a wireless connection for communicating with a smartphone. This will accommodate dual-device security for transactions requiring both a host computer and a specific smartphone registered to the authorized user of the data key to complete the transactions.

In the illustrative embodiment, the unsecured partition 13 is active as general purpose memory upon plugging the data key into an appropriate port in an interfacing device, while the secured microprocessor 14 is connected to the secured partition 12 to enable the secured transaction functionality of the data key when a switch 17 (typically a capacitive touch sensor or depression switch) on the data key is physically touched or pressed. The switch 17 may be illuminated by a light 18 (typically an LED), which may blink, to alert the user of the need to touch or press the switch to activate the data key for secure transactions. The requirement of human interaction with the switch 17 within an appropriate time frame for initiating a secure transaction (e.g., at least one second, but not more than ten seconds, after switch activation) inhibits emulation or "hacking" of the data key by a hacker that is not in physical possession of the data key. As an additional security measure, the switch 17 may include a bio identifier limited to the authorized user of the data key, such a fingerprint sensor, or a specific touch sequence programmed by the authorized user during an initialization procedure (e.g., double click, triple click, combination of clicks and delays forming a "combination lock" sequence, etc.). The validation fingerprint, combination code, or other personal identifier is preferably stored as encrypted data on the data key 10 as opposed to the host computer or another component in the system.

The secured transaction functionality 15 and associated secure data stored in the secured partition 12 of the data key includes a range of features. A non-exhaustive list of typical features includes data key firmware and a unique identifier (key ID) assigned to the key for use in security operations. The firmware runs the data key and may load a "thin driver" onto a host computer for communicating with the data key. Since the data key includes a resident microprocessor, the "thin driver" only enables interaction with the input-output and communication devices of the host computer, and does not utilize the processor or applications (e.g., browser) running on the host device. This avoids storing any of the secure data contained on the data key in the host computer, such as cookies stored in browsers. Transaction account numbers are never typed using a keyboard, which avoids hacking through keystroke monitoring.

The security features 15 also include transaction account data (e.g., credit card data, debit card data, bank account data, investment account data, etc.) which may be authenticated and stored as a permanent feature of the data key dedicating the data key to a specific account (e.g., a VISA® account for online purchases issued in the form of a data key). As an option, the user may be able to add and remove transaction accounts from the data key enabling the data key to utilize multiple transaction accounts. In this case, a user interface displayed in the host computer allows the user to select among accounts by "nicknames" previously entered by the user. But the transaction account numbers themselves are communicated directly from data key to the network port of the host computer, without storage on the host computer, to avoid exposing the actual transaction account numbers to the memory and main processor of the host computer. Another security feature is personal identification data for the registered holder of the data key (e.g., federated ID data, digital photo, bio identifier(s), social security number, driver's license number, passport number, resident alien [green card] identification data, etc.), which is typically authenticated and stored as a permanent feature of the data key.

The security features 15 may also include a password manager that allows the registered holder of the data key to create and change a password required to utilize the data key for secure transactions. Typically, the unsecured memory partition 13 may be accessed without a password, while the secured memory partition 12 and the functionality of the microprocessor 14 is password protected. The password manager also includes a password generator for creating secure passwords (e.g., GUID) and encryption keys (e.g. PKI private keys). The data key may also store PKI keys used in secure data storage of the secured memory partition 12 and in transmission of financial account data over communication networks (e.g., Internet) to transaction processing servers. While some legacy transaction processing servers may not presently be PKI enabled, proliferation of PKI security for transaction processing servers is expected. The data key is therefore PKI enabled and operational for using PKI encryption with any transaction processing servers that are also PKI enabled to utilize dynamic tokens or cryptograms traditional used in chip-and-pin payment transactions.

The security features 15 may also include the ability to register the data key for operation with a specific user and a specific mobile device, such as a smartphone, that is also registered to the same user. Another security features includes a one-time password (OTP) generator, which generates OTPs for used in secure transactions. In some modes of operation, transactions may require the data key and the mobile device registered to the same user. For example, a transaction initiated by the data key may involve an OTP generated by the data key for the specific transaction, which is sent to the registered mobile device (e.g., by text message to a directory number or email address assigned to the mobile device registered to the same user), which the user must receive (via the registered mobile device) and enter into the data key (via the host computer into which the data key has been plugged). The correlation of data key and mobile device ownership serves as a major security feature (dual-device security) for transactions requiring this feature. The mobile device correlation may therefore be established in a restricted manner, for example when the data key is initialized by the manufacturer, and may be a semi-permanent feature of the data key. Typically, the mobile device correlation may be treated with the same security procedures as the registered user identification date (e.g., federated ID). For example, changing the mobile device correlation or federated ID data may require a replacement data key either by reprogramming by an authorized technician in physical possession of the data key or by online service through an authorized technician having special access codes and credentials as required to register the data key to a different mobile device. While OTPs have been described as a specific example of a transaction-specific security code, other types of security coded may be utilized, such as QR codes, barcodes, and so forth.

The data key is configured to plug into a host computer 20a with a suitable data port (e.g., USB port). The data key is designed to be largely indifferent to the specific host computer 20a and contains complete processor and driver features to work with virtually any host computer utilizing standard interfaces. When plugged into the host computer 20a, the data key receives power from the host computer, which is sufficient for engaging in transactions utilizing a host computer. The data key may also include a wireless antenna 21, which allows the data key to communicate with another device, such as the mobile device registered for use with the data key, without having to unplug the data key from the host computer 20a, provided that the mobile device is in sufficiently close proximity to the data key. In some embodiments, transactions may also be enabled that do not utilize a host computer. A prime example is NFC transactions through a "touch-and-go" point-of-sale terminal. In this case, the NFC point-of-sale terminal serves as a host computer 20b for the data key even though the data key need not be physically plug into the point-of-sale terminal (although point-of-sale terminals in the future may be configured with hardware ports for receiving data keys). As another non-plug example, the data key may engage in certain transactions through a mobile device 30 without being physically plugged into the mobile device or any other host computer. In this case, the mobile device 30 serves as the host computer for the data key, which interacts with a mobile app 32 running on the mobile device. The mobile app activate on a mobile pin pad (among other features) that the operator uses to enter an OTP that the data key sends to the mobile device, typically by text message. For this non-plugging functionality, embodiments of the data key may include an antenna 21 and associated onboard battery 19, NFC array, RFID array, or other power source to power the data key without the need to plug the data key into any host device.

Figure 1B:
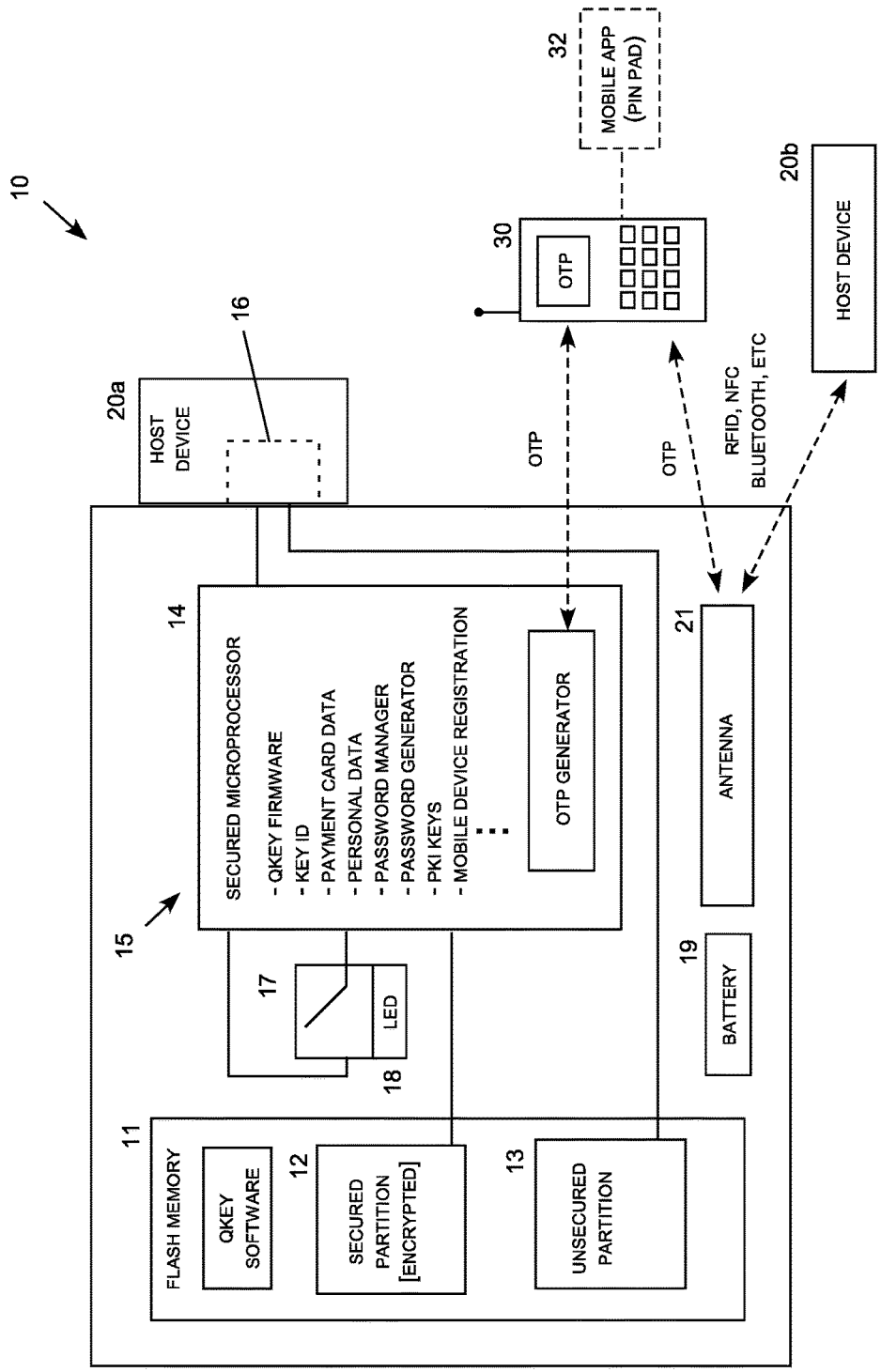
FIG. 1B is a block diagram of an alternative design using a portable data storage key and associated systems for conducting secured online transactions.

FIG. 1B is a block diagram of an alternative design embodying the same concepts as depicted in FIG. 1A with the exception as to how the enabling switch 17 is utilized. An alternative to physically enabling or disabling the secured memory 12, the biometric switch 17 status is fed back into the secured microprocessor 14. Personal data can be stored securely in secured memory using encryption algorithms, but the key to de-encrypting this data is not available (used) until the biometric switch is activated by the user. This design also illustrates that the separation between secured and unsecured memory does not have to be physical but could be accomplished through a virtual software barrier.

Figure 2A:
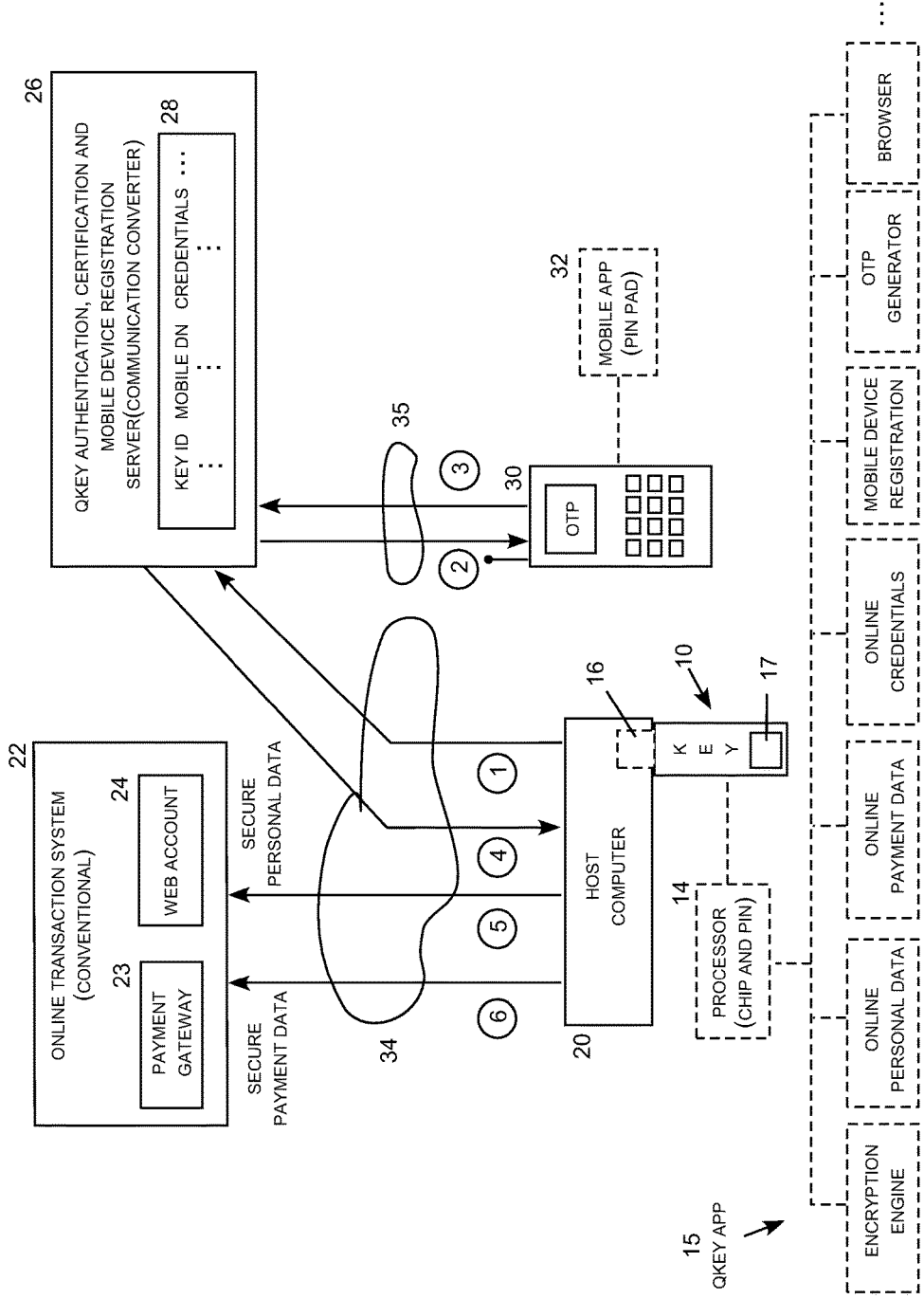
FIG. 2A is block diagram of a first mode of operation of the data storage key when conducting secure online transactions.

The data key 10 described above can be used in a variety of different transaction processes, which are illustrated in the remaining figures. FIG. 2A is block diagram of a first mode of operation of the data storage key when conducting secure online transactions. The data key 10 is plugged into a corresponding receptacle (typically USB Type-A) on a host computer 20, such as a conventional laptop or desktop personal computer. The data key includes the microprocessor 14, software 15, and touch button 17 among the other components and options described above with reference to FIG. 1. A key with a different data port, an adapter, or a wireless data link may be used to operative connect the data key to devices with different types of ports, such as tablet computers, smartphones, POS terminals, and so forth. The data key interacts with an online transaction system 22, which in this example may be a conventional transaction system operated by an online retailer (e.g., Amazon® for illustration purposes) that includes a payment gateway 23 and a web account 24. An online authentication, certification and mobile device registration server 26 configured to support the data key (e.g., "QKEY® server for illustration purposes) supports the data key functionality. The QKEY server 28 in this example includes a registration database 28 containing a record for each data key supported by the server. For the present example, the record for the data key 10 correlates the key ID for the data key with the mobile directory number of the mobile device 30 registered for use with the data key, as well as online credentials that can be used to validate the data key 10 when a transaction is attempted using the data key. The mobile device 30, such as a smartphone, runs a mobile app (e.g., QKEY app) configured to support the data key. Among other functionality, the mobile app implements a mobile pin pad that allows the user to enter a pin number (e.g. OTP) using the touchscreen of the mobile device (smartphone') to avoid the entry of any keystrokes into the user's mobile device.

The transaction system shown in FIG. 2A thus uses four devices (data key 10, host computer 20, QKEY website 26, and the mobile device 30) to complete an online transaction, such as a credit card or debit card purchase, through the online transaction system 22, which may be a conventional online retail system. That is, no special software, hardware or procedures need be implemented by the online transaction system 22 in order for the user to gain the increased security provided by the data key 10 and its supporting system. That system includes the data key 10 itself registered for use by a specific user, the mobile device 30 (e.g., smartphone) registered for use by the same user, and the online authentication server 26 that correlates the user's data key 10 with the user's mobile device 30 and may validate the user's online credentials (e.g., federated ID) stored on the data key as a condition for authorizing a transaction using the data key. The requirement of all four components 10, 20, 26, and 30 to operate in the manner described below provides a very high level of security for online purchases without requiring any change to the structure, programming or operation of the retailer's transaction system 22.

Prior to the transaction process steps shown in FIG. 2A, the user has used the host computer to advance to the payment stage of a transaction with the retailer's transaction system 22 (of course, the same procedure would be applicable for any type of transaction, such as online bill payment, Paypal or other funds transfer, and the like). The recipient of the intended funds transfer and the item to be purchased (or subject matter of other type of funds transfer)

have therefore been identified, and the user is ready to effect the payment. If not already inserted in the host computer 20, the user then inserts the data key 10 into a corresponding receptacle (e.g., USB Type-A) on the host computer 20. The user touches or presses the button 17 (possibly with a previously defined tap sequence or fingerprint read for added security) to activate the data key 10 for secure transactions. At this point, the data key 10 may cause a password app to be displayed on the display screen of the host computer 20. The data key 10 then requires the user to enter the predefined password to continue. A range of other security measures may be implemented at this time as a condition for continuing with the transaction.

Once the data key 10 is successfully entered into transaction mode, the transaction process steps shown in FIG. 2A are indicated by circles containing step numbers adjacent to arrows indicating the direction of data flow. Step 1 is a network communication between the data key 10 via the host computer 20 and the authentication server 26. This typically involves the usual TCP/IP connection and HTTP browser protocols in which the data key 10 requests a dynamic IP address (DHCP) and uses its own browser running on the data key for the purpose of communicating with the authentication server 26. Using an OTP transaction process as the illustrative example, in step 1 typically the data key generates an OTP (initiation OTP) for the requested transaction and transmits the OTP and the Key ID number assigned to the data key to the authentication server 26. The authentication server 26 may also request credentials (e.g., federated ID), location of the data key (e.g., GPS location determined by the data key), and transaction data, such as the amount and recipient of the intended transaction. Accordingly, step 1 may actually involve one or more bilateral exchanges of information as part of the authentication process which is represented as a single step to avoid cluttering the diagram. Whether credentials, location, or transaction information are required for authentication may vary based on user settings and predefined other criteria (e.g., amount of transaction, type of item to be purchased, location of the data key), which may be predefined on the data key 10, the authentication server 26, or both. For example, small-dollar purchases and purchases from "whitelisted" vendors may proceed with a low level of authentication, while higher-dollar transactions and transactions with non-whitelisted vendors may requires additional authentication procedures. Transaction limits and other purchasing controls may also be applied. As a safety measure, the authentication process is typically completed without the transmission of financial account numbers or the directory number of the mobile device 30, which must be registered with the authentication server 26 prior to the transaction as a security measure.

If the authentication server 26 authenticates the transaction, in step 2 the authentication server 26 sends the OTP to the directory number of the mobile device 30 registered for use with the data key typically by text message. Although text message is usually a convenient way to receive the OTP, the system supports other user-selectable communication modes, such as voice call and email. In particular, if the user's mobile device 30 is a tablet that uses email but does not have a mobile directory number, the user may specify an email address to be stored in the authentication device 28 instead of a directory number. In this particular example, the authentication server 26 send the OTP (e.g., the initiation OTP generated by the data key 10) to the mobile device 30 via text message, which the user enters into the mobile pin pad 32 displayed on the mobile device 30 by the QKEY app previously downloaded onto the mobile device.

In step 3, the mobile device 30 sends the OTP entered by the user (return OTP) back to the online authentication server 26 through a return text message. Again, other communication media may be used at the user' selection. In step 4, the authentication server 26 relays the return OTP to the data key 10 via the host computer 20. In doing so, the authentication server 26 converts the OTP from a text message on a mobile communication to an Internet (browser) protocol for return to the data key. The authentication server 26 thus serves several functions in this proves, including message conversion between computer network communications (e.g., browser) in the computer network 34 and mobile telecommunications (e.g., SMS) on the telecommunications network 35, maintaining correlation of data keys and mobile devices registered to the same users, authentication of data key transactions, and OTP relay between the data key 10 and the mobile device 30.

The data key 10 then compares the initiation OTP to the return OTP and proceeds only if they match. It the correct OTP is received, in step 5 the data key 10 sends secure personal data to the appropriate destination, typically to the web account 24 of the online transaction system 22. In step 6, the data key sends secure payment data (e.g., credit card or debit card data) to the appropriate destination, typically the payment gateway 23 of the online transaction system 22. Since this transaction data was previously stored on the data key 10, there is no keyboard entry or storage of the transaction data on the host computer 20 at the time of the transaction. This removes the most vulnerable points for hacker access from the online transaction process.

The data key 10 may also be configured to emulate the data encryption functionality of conventional chip-and-pin processors (e.g., PKI, tokenization, and cryptogram) enabling the data key to engage in chip-and-pin transactions when the online transaction system 22 is configured to receive data from chip-and-pin terminals, thus avoiding the need for a chip-and-pin readers at the user's location. The data key can also engage in chip-and-pin transactions in which the host computer 20 functions as a chip-an-pin reader (e.g., the host computer is a POS terminal), thus allowing the user to rely on the data key to conduct in-store as well as online transactions. The data key may also store account data for multiple accounts (e.g., multiple credit and debit cards), thus eliminating the need for the user to carry traditional accounts cards. As a result, the data key is the only instrument required to use multiple financial accounts, both magnetic strip and chip-an-pin, both online and in point-of-sale transaction.

Figure 2B:
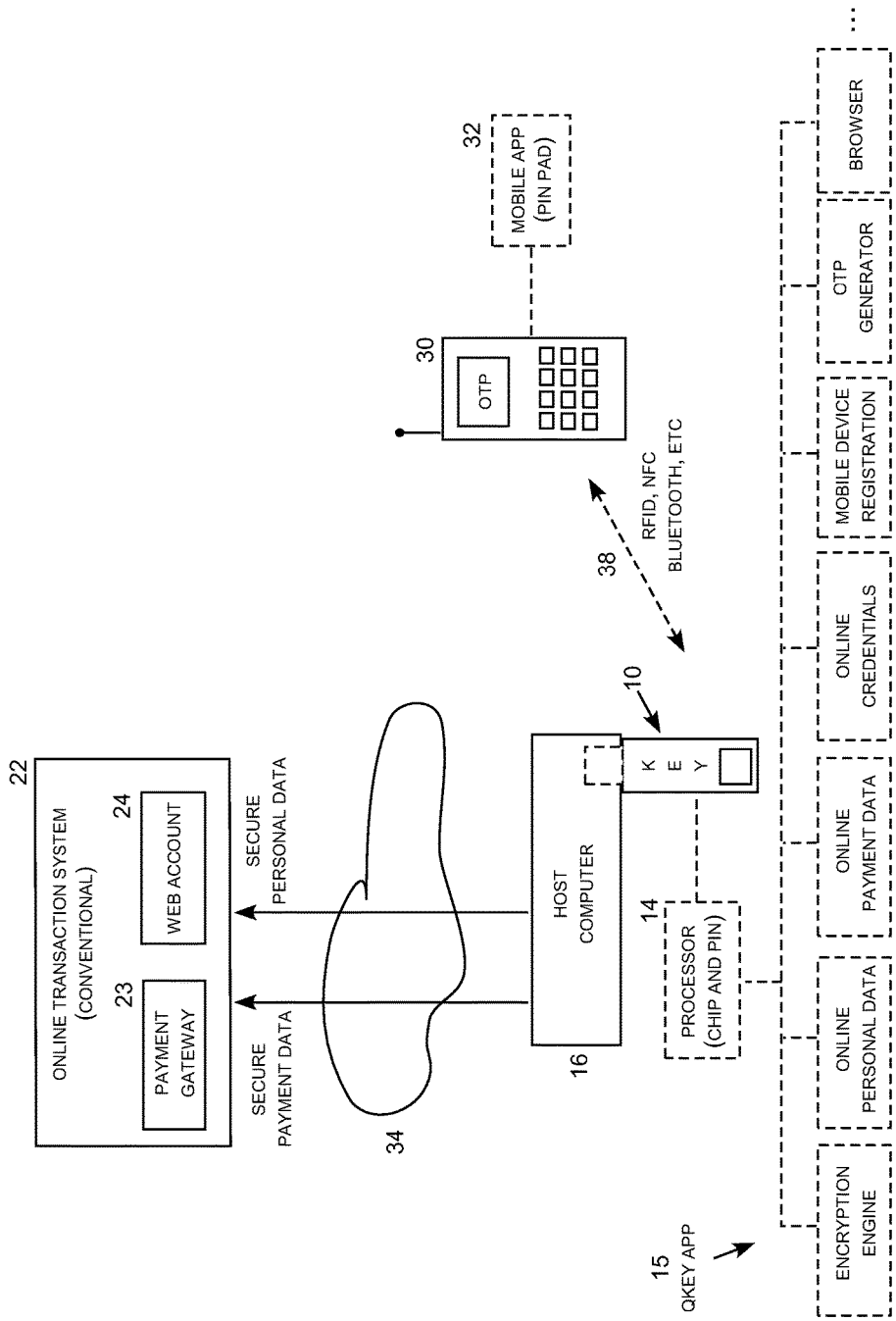
FIG. 2B is block diagram of a second mode of operation of the data storage key when conducting secure online transactions.

FIG. 2B is block diagram of a second mode of operation of the data storage key 10 when conducting secure online transactions. In this operation mode, the authentication server 26 has been eliminated. Instead, the data key 10 communicates by physical plug or wirelessly directly with mobile device 30, for example by RFID, NFC or Bluetooth communication link. In this case, the data key 10 may use the mobile directory number or another device parameter, such as mobile identification number (MIN), electronic serial number (ESN) or media access control (MAC) address assigned to the user's mobile device 30, to ensure that the correct mobile device is present in the same location as the data key. The data key 10 or the mobile app 32 running on the mobile device 30, individually or in combination, may implement the other functionality of the authentication server 26 described above, such as validating bio-identifier (e.g., fingerprint), limiting purchasing authority based on transaction limits, purchase type, geographic location, and so forth.

Figure 2C:
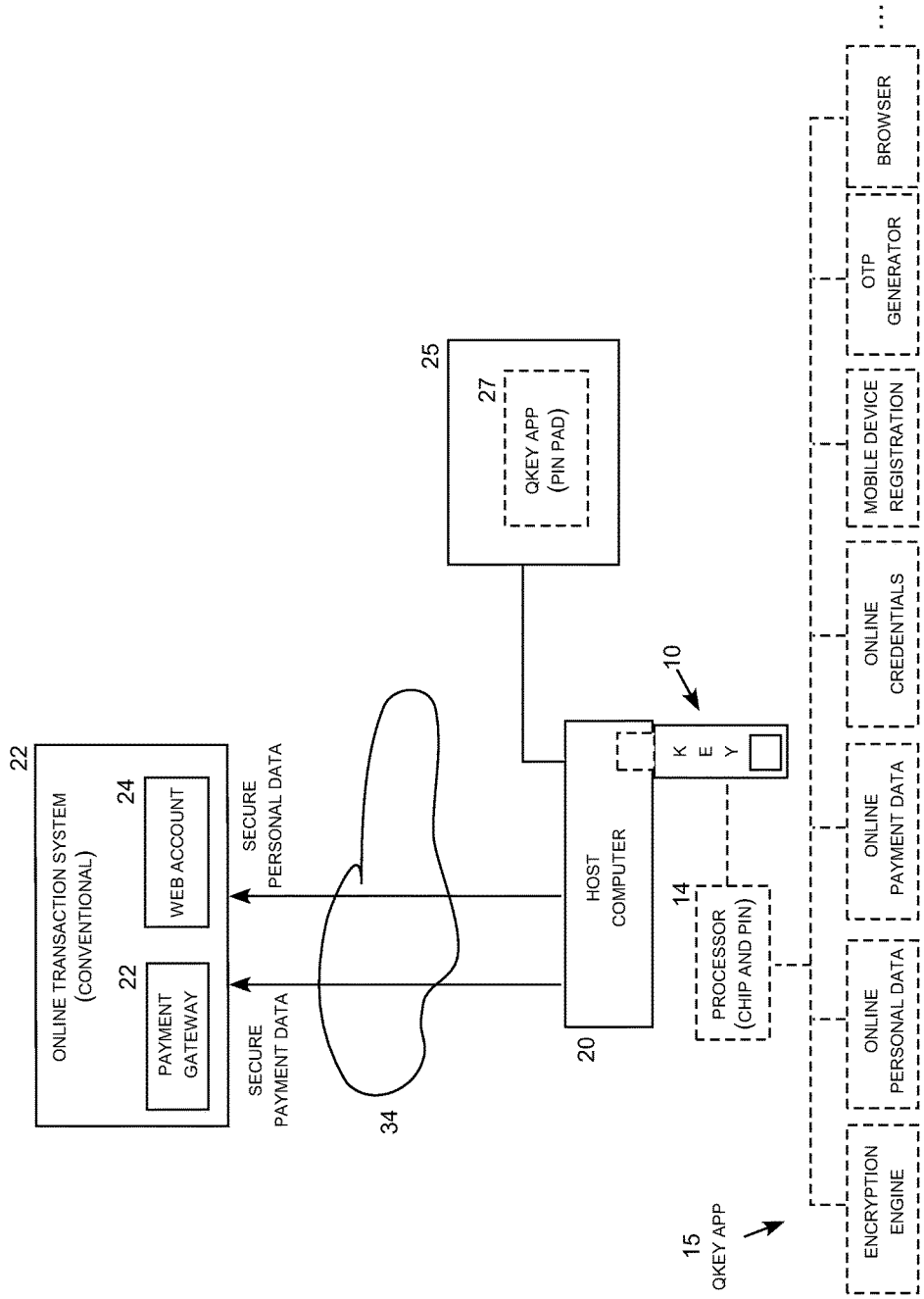
FIG. 2C is block diagram of a third mode of operation of the data storage key when conducting secure online transactions.

FIG. 2C is block diagram of a third mode of operation of the data storage key when conducting secure online transactions. In this operation mode, the authentication server 26 and the mobile device 30 have been eliminated. In this example, the data key 10 may be configured to operate only when plugged into (or when in wireless communication proximity with) a specific host computer 20. For example, the data key may only allow transaction to be made when it validates or media access control (MAC) address assigned to a particular host computer 20 previously registered by the owner of the data key as authorized for conducting transactions with the user's data key. Alternatively, if dual-device security is not desired (for example, for a low level of purchasing authority), the data key 10 may not be limited to a specific host computer. Nevertheless, the host computer 20 typically runs an app 25 (e.g., QKEY app) that implements a pin pad 27 (typically a screen-display pin pad that does not utilize keystrokes) to receive the OTP. This ensures that the user is physically present to touch or press the activation button 17 on the data key, and to enter the OTP into the host device 20, which prevents remote transaction hacking. While a great deal of more sophisticated security measures are described throughout this specification, this transaction mode illustrates a base security level requirements of (1) user physical presence at the key location to touch the key activation button 17, (2) user entering a password to activate the key, (3) user physical presence at the host computer to enter the OTP, and (4) communication of the user's personal data and payment data without keystrokes or local storage on the host computer, will be sufficient to defeat the most prevalent types of online data hacking.

Figure 3:
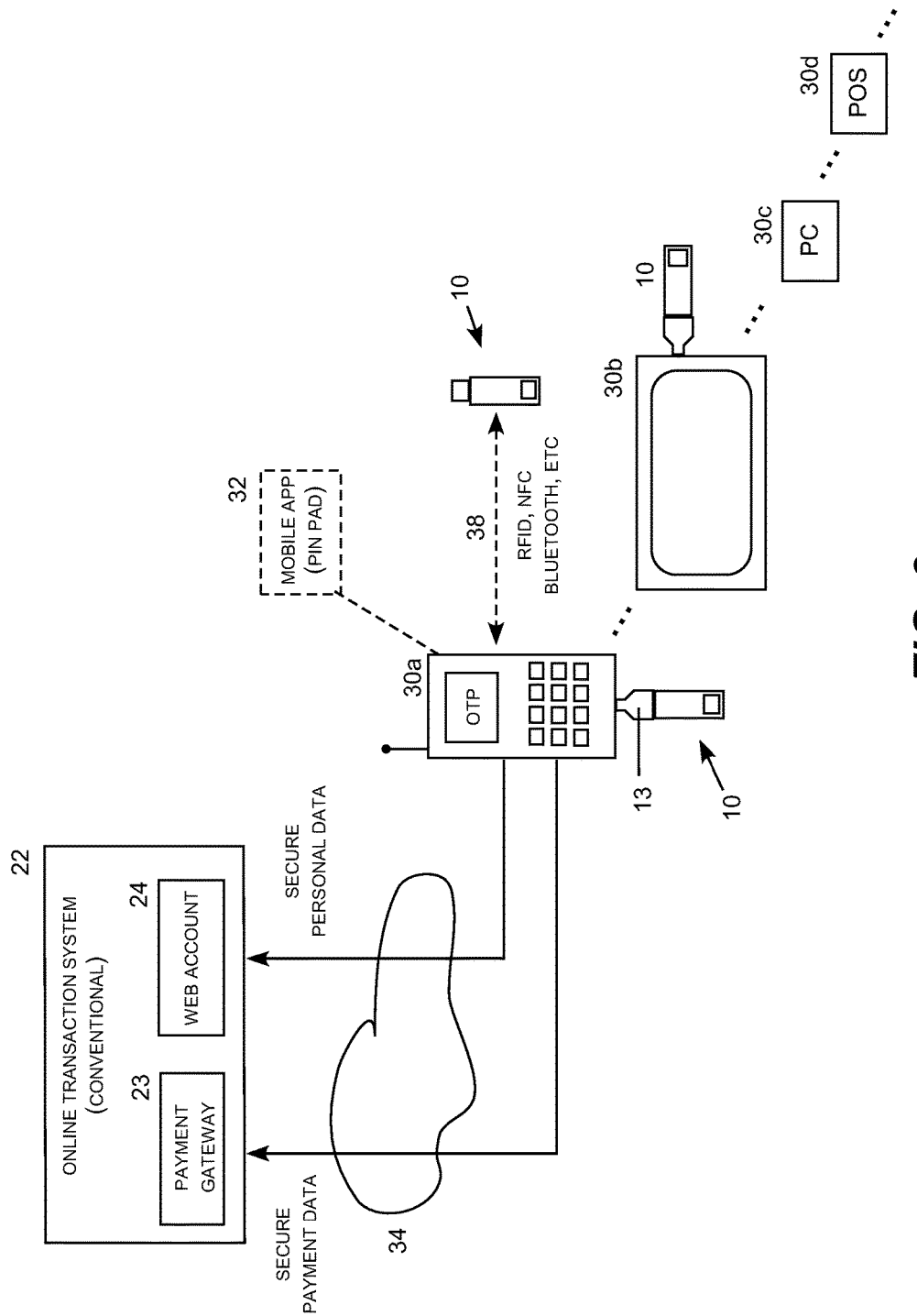
FIG. 3 is block diagram of the data storage key operating with different types of host devices.

FIG. 3 is block diagram of the data storage key operating with different types of host devices, such as a mobile phone 30a, tablet computer 30b, personal computer (PC) 30c, point-of-sale terminal (POS) 30d, and so forth. The various types of host devices 30a-d may physically receive the data key 10 via a plug-receptacle connection or use a wireless data link (e.g., RFID, NFC, Bluetooth, etc.) to communicate with the data key. A range of adapters represented by the adapter 13 may be available to convert the plug type on the data key to a different receptacle type available on the host device. The same data key may there be used in a variety of transaction contexts, and using a variety of communication interfaces, depending on the type of host device available. An embodiment carrying a battery, in particular, may be operative with a mobile telephone using a Bluetooth interface or a USB plug adapter, with a table computer using a Bluetooth interface or a USB plug adapter, with a PC by plugging into a conventional USB port, and with a touch-and-go POS using NFC communication link. When RFID communications are available on personal computers, smartphones and tablets (which is expected to become increasingly deployed in the future), the data key can communicate wirelessly with a host device using the RFID communication link without having an onboard battery.

Figure 4:
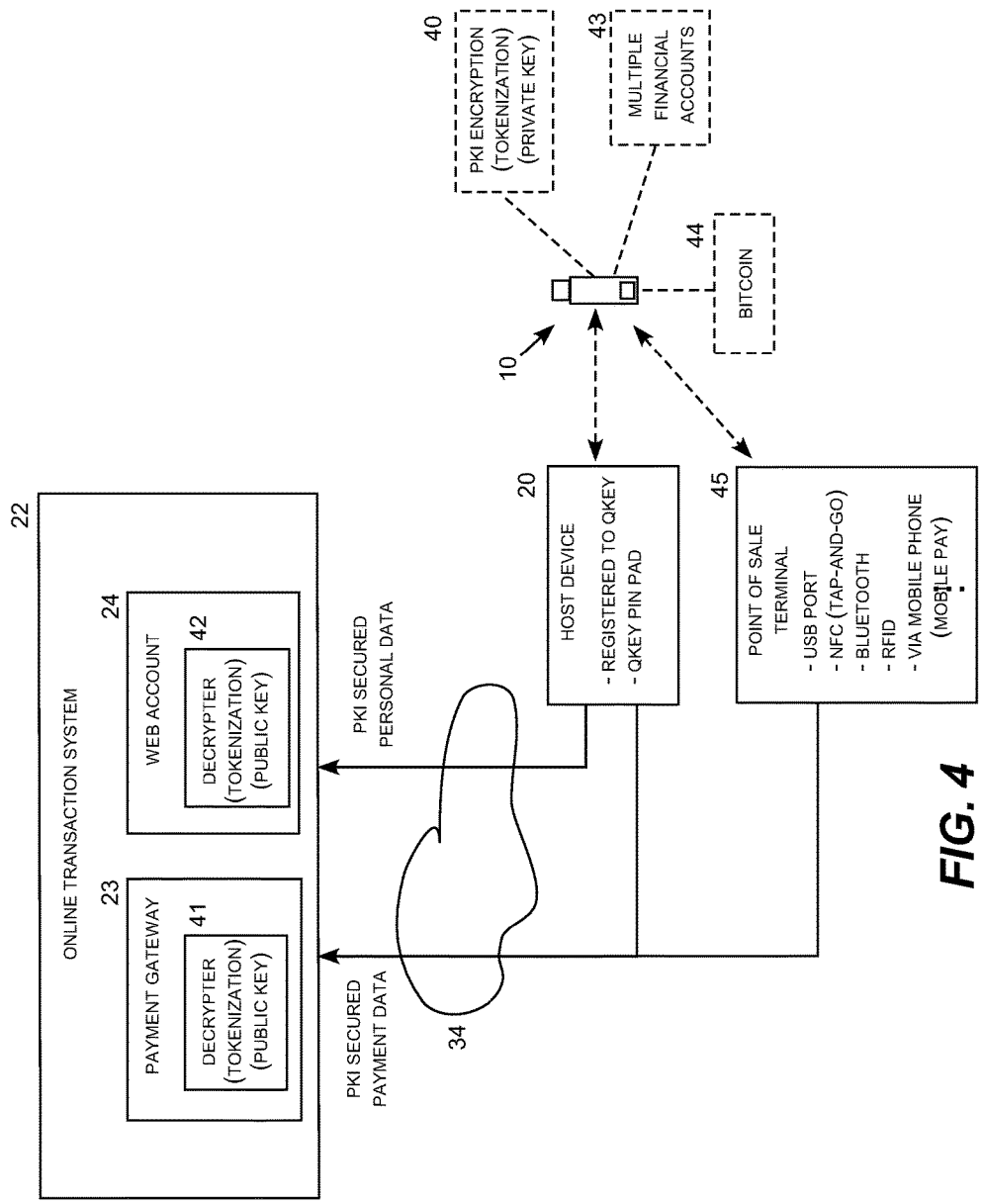
FIG. 4 is block diagram of the data storage key operating with different types of host devices.

FIG. 4 is block diagram of the data storage key utilizing public key encryption. At present, conventional online transaction system are not configured to receive transaction data encrypted with public key encryption. However, it is expected that public key encryption will become increasingly deployed in the future for online transactions. The data key 10 may therefore have a public (PKI, tokenization, or cryptogram) or other type of encryption module 40 for encrypting payment data and personal data transmitted to an online payment system 22. For example, the data key 10 may use private PKI keys to tokenize the data, which the online payment system 22 decrypts using a public key. The data key will thus provide a bridge, supporting both PKI and non-PKI transaction servers, as the PKI technology proliferates through the online transaction community in the coming months and years.

As other options shown in FIG. 4, the data key may support multiple financial accounts 43 as well as BITCOIN® and other types of electronic currency. The data key 10 may also work with a range of host devices 20 that are not configured as point-of-sale terminals (e.g., PC, tablet, smartphone); as well as a range of point-of-sale terminals 43 using any available communication link, such as a USB port, NFC tap-and-go, Bluetooth, RFID, or other communication interface. The data key 10 may also operate with mobile payment via mobile phone systems by communicating (e.g., plug-in or wireless link) with the host mobile phone to provide financial account, mobile pin pad, password protection, and other security features of the data key yielding enhanced security for mobile pay applications. For example, requiring the data key to be physically present (providing dual-device security) and requiring the user to enter the data key password to activate mobile pay applications would greatly enhance the security of the mobile pay transaction. The data key may also provide a rich layer of mobile pay transaction security, such as geographic, transaction type and overall transaction limits for mobile pay transactions.

Figure 5:
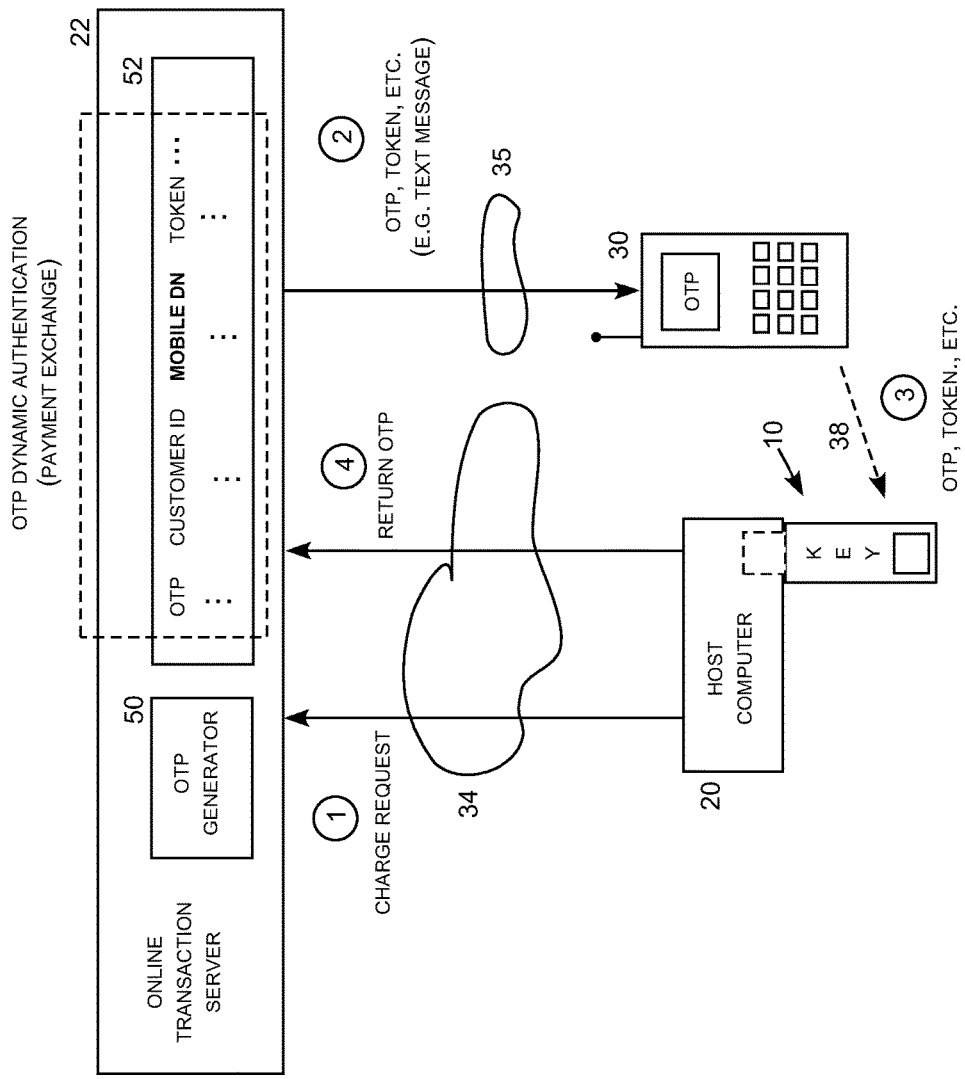
FIG. 5 is block diagram of the data storage key operating with a dynamic payment exchange.

FIG. 5 is block diagram of the data storage key operating with an online transaction system 22 that includes a dynamic payment exchange 52. In this alternative, some or all of the functionality described for the authentication server 26 with reference to FIG. 2A has been relocated to the dynamic payment exchange 52. The online transaction system 22 may also include an OTP generator 50, which may replace the OTP functionality onboard the data key 10 for some transactions. While conventional online transaction systems do not presently implement this type of dynamic payment exchange functionality, some POS transaction systems do (e.g. OTP and QR functionality) and it is anticipated that online transaction systems may begin to deploy this type of security in the future. The data key 10 will work seamlessly with these online systems including OTPs (or QRs) generated by the OTP (or QR) generator of the online transaction system 22 when available, and using its onboard OTP (or QR) capability when the transaction processor is not OTP (or QR) enabled.

In step 1 of this type of transaction process, the data key 10 sends a charge request for a particular transaction account to the online transaction system 22 via the host computer 20. The online transaction system 22 looks up a mobile directory number (or other dual-device security address) associated with the transaction account stored in the dynamic payment exchange 52. In this example, the dual-device security address is the mobile directory number of the mobile device 30 registered for use with the data key 10. The OTP generator 50 generates an initiation OTP for the transaction and in step 2 sends the OTP, typically by text message, to the mobile device 30. In step 3, the user then enters the OTP into the mobile pin pad on the mobile device 30, which transmits the entered OTP to the data key. This may be accomplished by physically plugging the data key into the mobile device 30 and then into the host computer 20, using a plug adapter if necessary, or by a wireless data link 38. In step 4, the data key 10 sends the return OTP entered by the user (return OTP) to the online transaction system 22.

Figure 6:
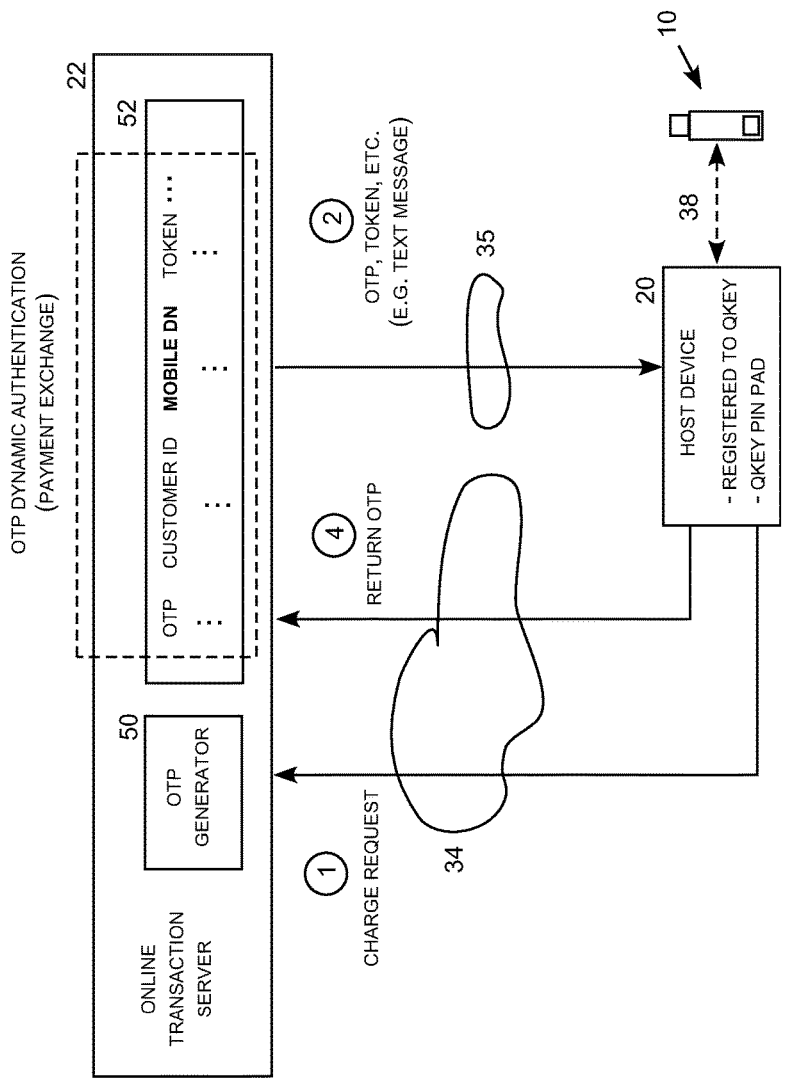
FIG. 6 is block diagram of the data storage key operating with a dynamic payment exchange utilizing two communication modes.

FIG. 6 illustrates another example in which the data key 10 communicates wirelessly with the host device 20, such as the user's mobile phone, for example possibly utilizing a battery onboard the data key of an RFID data link. In this example, the data key only needs to be in sufficiently close proximity to the host device 20, such as in the user's pocket, to engage in secured transactions. The user need only touch or press the button on the data key to enter it into financial transaction mode, and a secure the transaction will proceed using the host device 20 (e.g. smartphone or tablet) to conduct the transaction. Importantly, the user's financial account numbers and personal data will never be typed or stored in the host device 20, a transaction will not be permitted to proceed unless the data key 10 is in sufficiently close proximity to the host device 20 registered to work with the data key, and the host device 20 is used to receive the data key password and OTP. Transaction limits, geographical limits, bio-identifiers, activation click sequences, transaction-specific OTPs, and all other security features and functionality may be available without requiring a physical plug connection between the host device and the data key. In one alternative, for example, the user may have to touch or press the activation button on the data key, and tap the key to the touchscreen (like a tap-and-go card process requiring very close proximity for an NFC data link) within a predefined time period to active the transaction mode. Once the transaction mode is active, a longer range data link (e.g. Bluetooth) may be activated for a longer predefined time period in order to transmit personal data, financial account data, OTP, and any other data required to complete the transaction. In this alternative, dual-media (NFC and Bluetooth) between the devices (fata key and smartphone) engaged in dual-device authentication provides yet another level of security.

Figure 7:
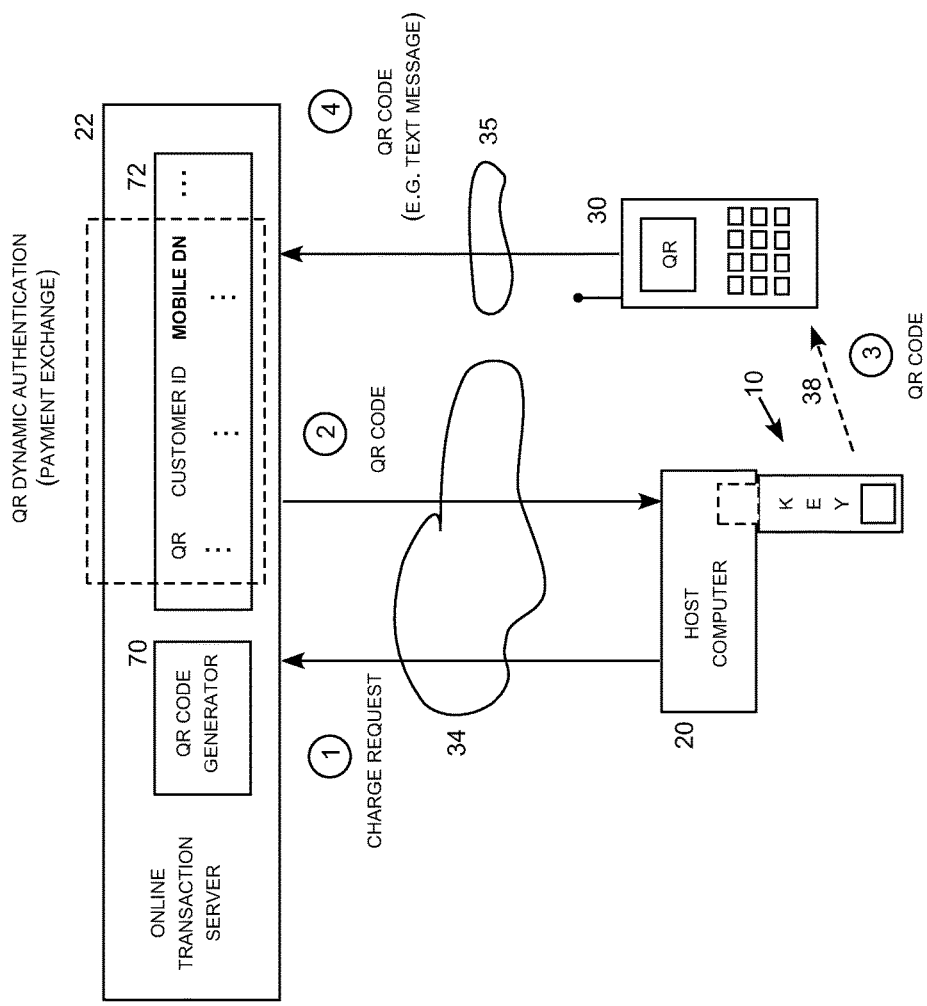
FIG. 7 is block diagram of the data storage key operating with a dynamic payment exchange utilizing a QR or other type of pictorial security validation.

FIG. 7 is block diagram of the data storage key operating with a dynamic payment exchange utilizing a QR or another type of pictorial security validation. In an OTP security procedure, a POS terminal reads a financial account number (e.g., magnetic strip reader, chip-an-pin reader, NFC touch-and-go reader, etc.). The backend transaction processor then generates an OTP and sends this to a designated device, such as a smartphone, registered to the holder of the financial card. The user then enters a return OTP into the smartphone to authorize the transaction. In a pictorial (e.g., QR) code system, on the other hand, the backend server generates and transmits the QR code (which contains a return address) to the POS terminal. The user then takes a picture of the QR code with their smartphone, which triggers a return text message which sends the user selects to send the QR code back to the backend server.

The data key 10 emulates the POS terminal in this type of transaction as shown in FIG. 7. In step 1, the data key 10 sends a charge request to the transaction processing system 22 (back-end transaction processor) via the host computer 20. In step 2, the transaction processor sends a QR code to the host computer 20. In an ordinary transaction the QR code would be displayed by a POS terminal, captured by a camera on a smartphone, and returned to the transaction processor by text message. Instead, in step 3 the data key sends the QR code to the mobile phone 30 registered for use with the data key, in this example by the wireless link 38. In step 4, the QKEY app running on mobile phone 30 loads the QR code into a text message addressed to the back-end transaction processor. The user then selects the text message to send the QR code to the transaction processor, effectively emulating the QR transaction process through the data key 10.

Figure 8:
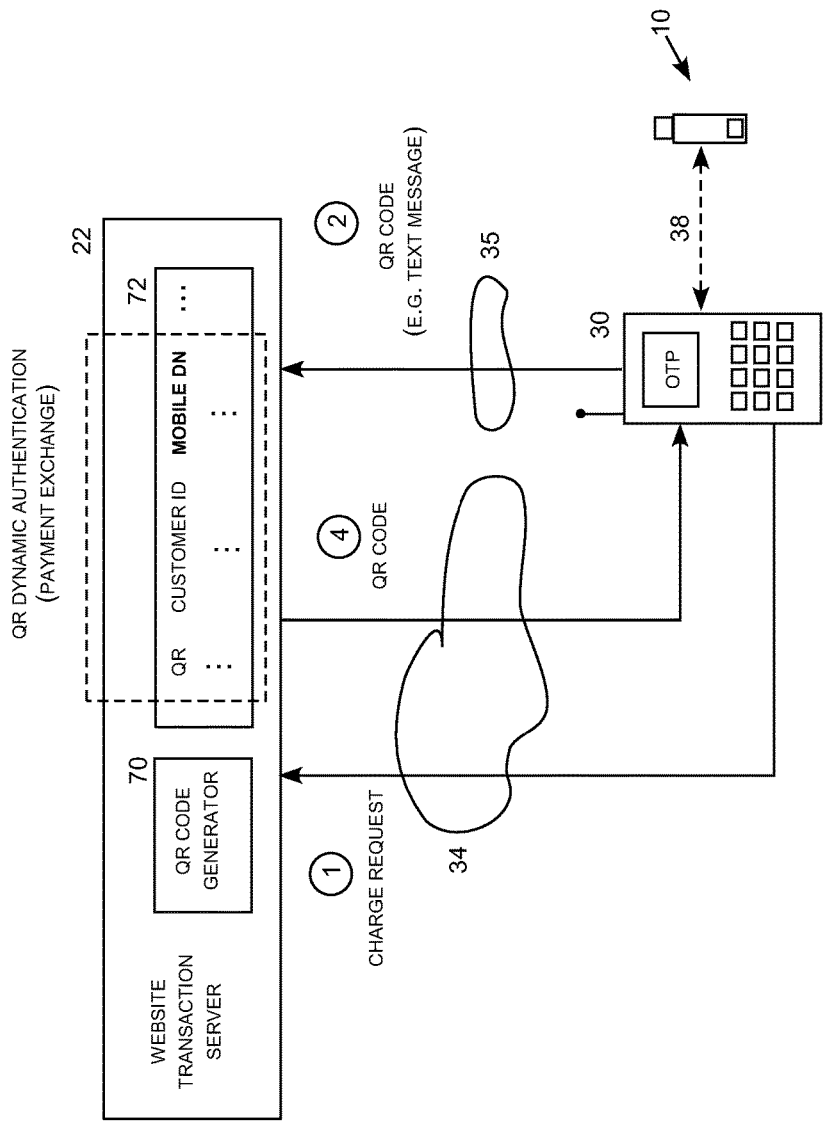
FIG. 8 is block diagram of the data storage key operating with the dynamic payment exchange utilizing the QR or other type of pictorial security validation without a single host device utilizing two communication modes.

FIG. 8 illustrates an alternative in which the smartphone 30 operates as the host computer for the data key 10. In this option, the same device (the smartphone 30) engages in browser (or another type of network communications) over the Internet 34, as well as mobile telephone communications over the mobile telephone network 35, to emulate what appears to be a dual-device QR authentication process with the transaction processing system 22. In this transaction mode, the data key 10 communicating via the mobile device 30 emulates a POS terminal, both receiving and returning the QR code generated by the dynamic payment exchange 22. Importantly for this transaction mode, a conventional QR-enabled payment exchange 22 may operate in the usual manner, with the data key 10 communicating via the mobile device 30 emulating a conventional POS terminal, requiring no programming or other changes to the conventional QR-enabled payment exchange 22.

Figure 9:
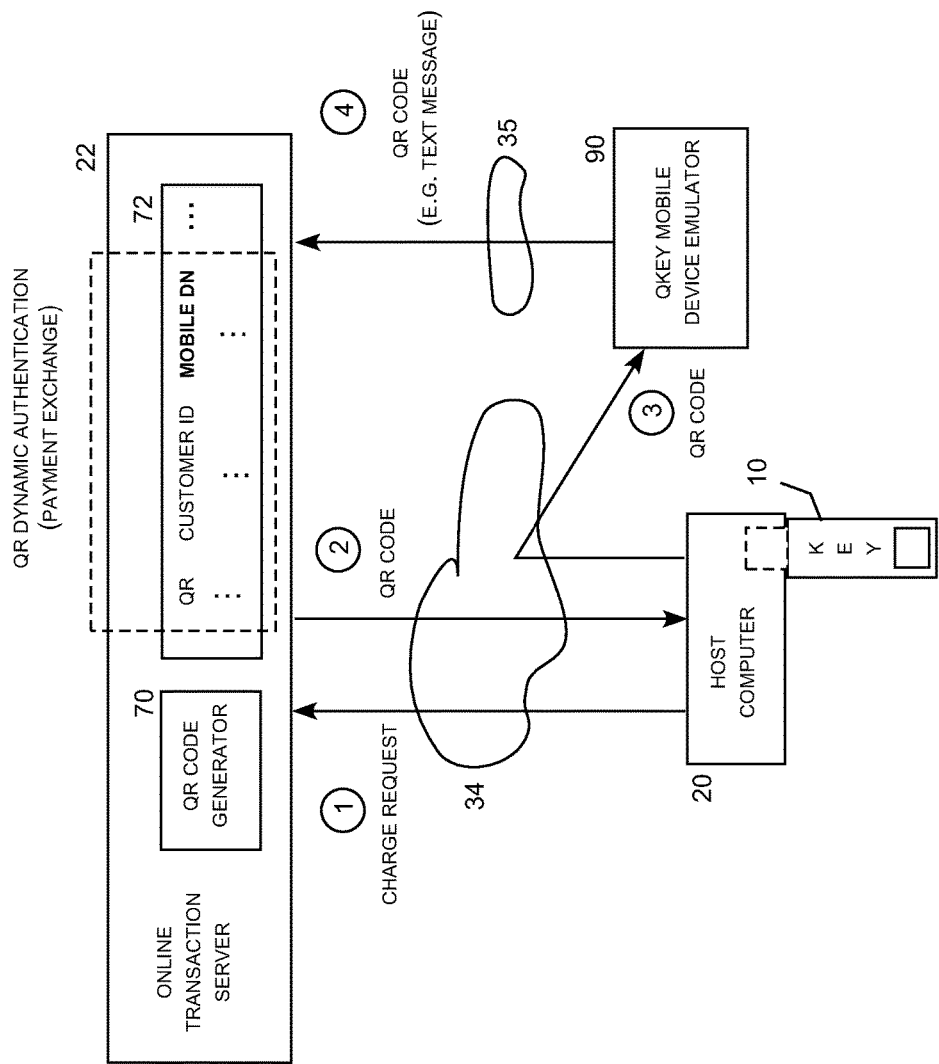
FIG. 9 is block diagram of the data storage key operating with the dynamic payment exchange utilizing the QR or other type of pictorial security validation utilizing an online mobile device emulator.

FIG. 9 illustrates another alternative, in which a host computer 20 that does not have mobile telephone functionality emulates what appears to be a dual-device QR authentication process with the transaction processing system 22. This transaction mode may be used when the user does not have a mobile telephone account, does not have their mobile telephone available, or does not have mobile telephone service. This transaction mode is illustrated for a QR transaction but works equally for OTP or any other dual-device protocol utilizing the Internet and a mobile telephone link. In this alternative, an online mobile device emulator 90 provides the required network-type conversion. That is, the mobile device emulator 90 communicates with the data key 10 via the host computer 20 over the Internet 34, while also communicating with the transaction system 22 over the mobile telephone system 35. In step 1, the data key 10 via the host computer 20, sends a charge request to the online transaction system over the Internet 34. In step 2, online transaction system sends a QR code back to the data key 10 via the host computer 20 over the Internet 34. In step 3, the data key 10 via the host computer 20 then sends the QR to the mobile device emulator 90 over the Internet 34. In step 4, the mobile device emulator 90 then sends the QR code back to the transaction system 22 on the mobile telephone system 35, as expected by the transaction system. In this manner, the data key 10 using a host computer with an Interconnect connection but no telephone connection, along with the mobile device emulator 90 deployed to support the data key, may be used to engage in QR code transactions that normally require both a POS terminal and a mobile telephone device.

Figure 10:
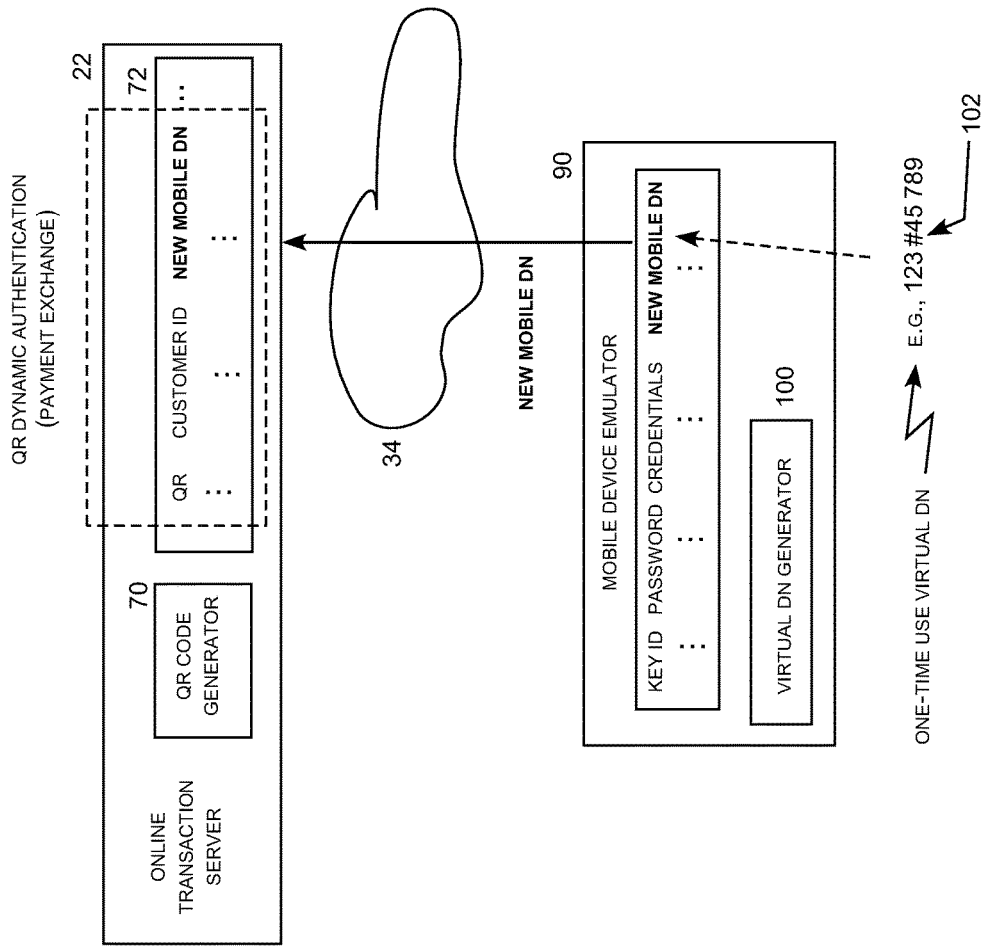
FIG. 10 is block diagram the mobile device emulator implementing one-time virtual directory number functionality.

FIG. 10 block diagram shows the mobile device emulator 90 implementing a one-time virtual directory number functionality, which is a further refinement of the system shown in FIG. 9. Since this transaction process uses an emulated mobile telephone communication, a real mobile directory number assigned to a functioning mobile telephone device need not be utilized. This allows the mobile device emulator 90 to change the mobile directory number associated with a transaction account at will. For example, this allows the mobile device emulator 90 in this example to include a virtual directory number generator 100 that changes the mobile directory number associated with a financial account every time the directory number is used in a transaction. To implement this one-time virtual directory number capability, the mobile device emulator 90 logs into the dynamic payment exchange 72, typically over the Internet 34 using an interface protocol defined by the dynamic payment exchange, to change the mobile directory number associated with a financial account every time the directory number is used in a transaction. Since this virtual directory number is not a real directory number used in mobile communications, the virtual directory number may fall outside the real mobile directory number protocol. For example, as shown in FIG. 10, the virtual directory may include a function key (* or #) in the middle of the directory number where only numeric digits are acceptable in a real directory number (a # is shown as the fourth digit in the example shown in FIG. 10). In this manner, the mobile device emulator 90 may generate an unlimited (for all practical purposes) number of virtual directory numbers without running the chance of creating a potential conflict with any real directory numbers.

Figure 11:
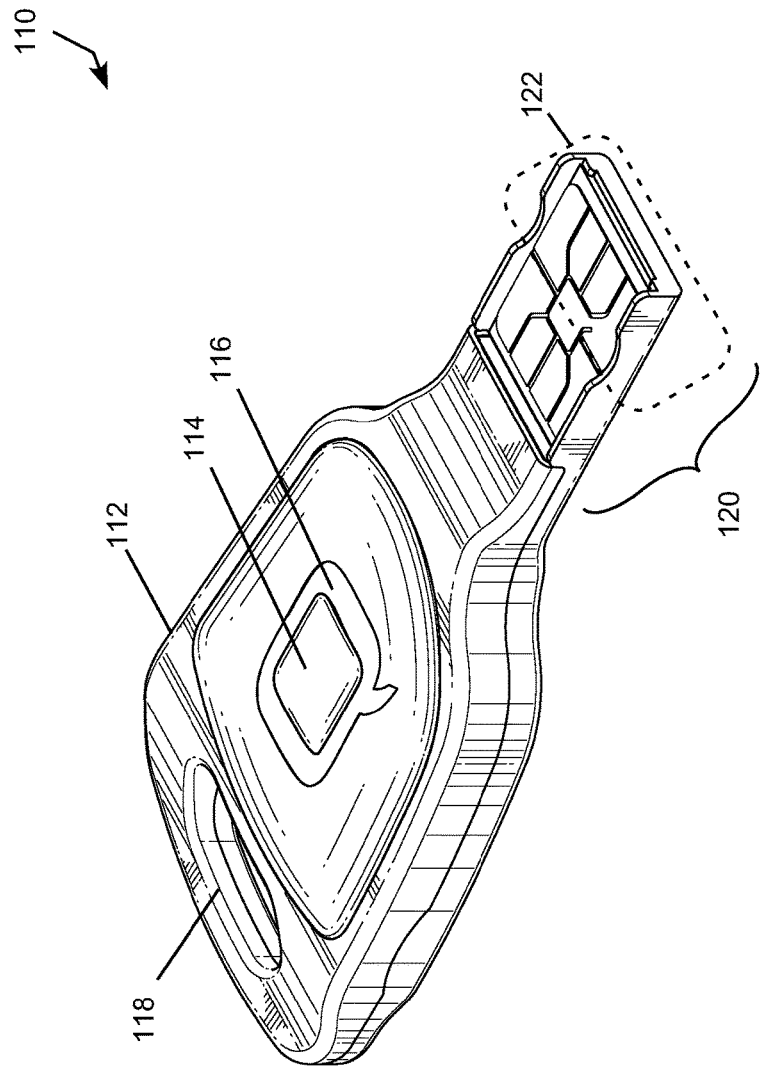
FIG. 11 is a perspective view of an illustrative embodiment of a data storage key including a dual-purpose electric contact.

Different multi-purpose embodiments may perform different functions in a wide range of combinations. As a first example, FIG. 11 is a perspective view of an illustrative embodiment of a data storage key 110 evoking the shape of the conventional hardware key that includes a case 112 housing the internal electronics, a touch sensor 114, a light 116 in the shape of a "Q" and a hole 118 for a lanyard or keychain. This embodiment includes a dual-purpose electric contact that serves both as a four-pin USB 124 contact and an eight-pin chip-and-pin (EMV) contact 120.

Figure 12:
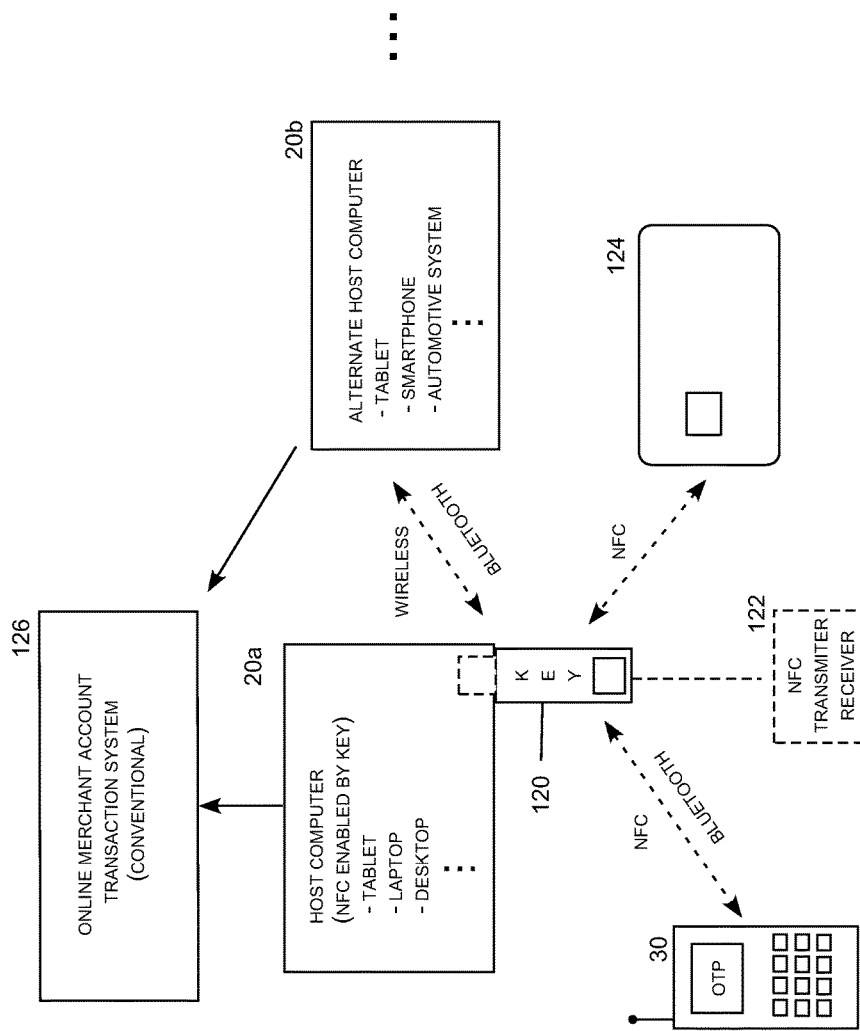
FIG. 12 is a conceptual illustration of a data storage key operating as near-field communication (NFC) receiver for merchant account transactions.

FIG. 12 is a conceptual illustration of a data storage key 120 that includes a near-field communication (NFC) transmitter-receiver 122 operable for transmitting power sufficient to illuminate passive NFC devices, such as the smartcard 124, to enable the passive NFC device to transmit data to the key 120. Power for this purpose may be provided by a battery (e.g., battery 19 shown on FIG. 1) onboard the key 120 or from the host device 20 via an NFC antenna onboard the key (e.g., antenna 21 shown on FIG. 1). The key 120 may also receive data from a powered NFC device, such as the smartphone 30 and/o a host device regardless of whether the key 120 caries its own separate power supply. In an alternative, the data key may be a passively powered device utilizing power transmitted by the powered NFC device in a first data link, and utilizing power transmitted by host device in a second data link. The data key 120 may therefore be plugged into a hardware port (e.g., USB port) on a host device 20a, or it may communicate wirelessly (e.g., Bluetooth) with a host device 20b. The host device, in turn, communicates with an online merchant account transaction system 126 to complete financial transactions in which the key 120 serves as an NFC transmitter-receiver.

To conduct an NFC transaction, the key 120 receives financial account (e.g., credit card, debit card, prepaid card, etc.) transaction data from NFC devices, such as the NFC enabled smartphone 30 or the touch-and-go smartcard 124. The data storage key 120 may plug into a non-NFC enabled host computer 20a, such as a tablet, laptop or desktop computer that communicates with an online merchant account transaction system 126 over any available communication system, such as the Internet or telephone system. As another option, the data storage key 120 may communicate wirelessly with a non-NFC enabled host computer 20b, such as a tablet, smartphone or automotive computer that communicates with the online merchant account transaction system 126 over any available communication system, such as the Internet or telephone system. This allows the data key to turn a non-NFC enabled host computer into an NFC-enabled merchant account terminal.

As another option, the data key 120 may also or alternatively communicate with the smartphone 30 or touch-and-go smartcard 124 via another available frequency, such as a Bluetooth communication link. Merchant account processing between the host computer 20a-b operating as a merchant account terminal and the online merchant account transaction system 126 may be otherwise conventional, requiring no changes to the financial account infrastructure to accommodate data key enabled merchant account transactions. The other data key functional and security measures described previously, such as the mobile pinpad, OTP, QR code, PKI security, cryptographic tokenization and other features may also be implemented for these NFC transactions. It will be appreciated that the data key can be easily adapted to providing encryption keys, access codes, and monitoring information for a range of other applications. For example, the data kay can download and store security clearance credentials, licenses, training certifications, technical materials, and access codes on a permanent or temporary basis.

Figure 13:
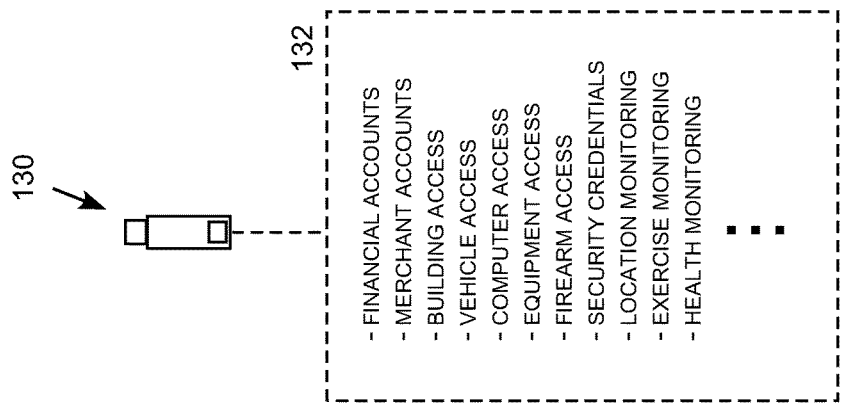
FIG. 13 is a conceptual illustration of the data storage key configured to provide several additional purposes.

FIG. 13 is a conceptual illustration of the data storage key configured to provide access to multiple tangible and intangible assets and other features, such as financial accounts, merchant accounts, building access, vehicle access, computer access, equipment access, firearm access, security credentials, location monitoring, exercise monitoring health monitoring, and so forth. For example, an operative may receive data and access codes for a particular assignment on (or download onto) a data key, which allow them access to particular buildings, vehicles, firearms, and computer files and other equipment for a limited time for the purpose of completing the assignment. This sensitive data may be encrypted and limited to the assigned individual by bio-identifier, such as fingerprint or touch code. Specific examples include examination taking, guest access to restricted areas and equipment, access to military facilities, repair assignments, remediation assignments, and so forth.

It should be understood that the foregoing relates only to the exemplary embodiments of the present invention, and that numerous changes may be made therein without departing from the spirit and scope of the invention as defined by the following claims.

The invention claimed is:

1. A data key for conducting secure transactions, comprising:
   non-volatile solid state memory;
   a microprocessor operative for storing encrypted data in the memory;
   a data port for communicating data stored in the memory between the data key and a host computer;
   a near-field communication receiver for wirelessly receiving financial transaction data from an NFC-enabled transaction device; and
   a switch and associated light, wherein the microprocessor causes the light to alert a user of a need to touch or press the switch to activate the data key for secure transactions using the encrypted data, and wherein the microprocessor activates the data key to engage in secure transactions using the encrypted data in response to detecting a touch or press of the switch.

2. The data key of claim 1, wherein the microprocessor is further configured to conduct transactions using the encrypted data in the memory through a dual-device security protocol involving a mobile device registered for use with the data key.

3. The data key of claim 2, where the microprocessor is further configured to participate in a dual-device security protocol by generating an initiation one-time-password (OTP) for used in connection with a transaction, transmit the OTP to a mobile device registered to the user of the data key, receive a return OTP from the mobile device, and transmit the personal identification data and transaction account data to a transaction processor in response to detecting a match between the initiation OTP and the return OTP.

4. The data key of claim 3, wherein the microprocessor is further configured to generate an initiation one-time-password (OTP) for used in connection with a transaction, transmit the OTP to a mobile device registered with the data key for use with the data key.

5. The data key of claim 3, wherein the dual-device security protocol utilizes a mobile app configured to running on the mobile device exposing a touchscreen pin pad on the mobile device for receiving user entry of the return OTP without utilization of keystrokes on the mobile device.

6. The data key of claim 1, wherein the memory further comprises an unsecured data partition.

7. The data key of claim 1, wherein the data port further comprises a dual-use electrical contact including eight contacts configured for communicating with a chip-and-pin port, and four of the electrical contacts are configured for communicating with a USB port.

8. The data key of claim 1, wherein the data port comprises a USB plug or wireless data port.

9. The data key of claim 1, wherein:
the data key is configured to engage in a dual-device security protocol;
the data port comprises a USB plug for establishing a first communication link with a host computer;
further comprising a wireless data port for establishing a second communication link with a mobile device for engaging in the dual-device security protocol.

10. The data key of claim 9, wherein the dual-device security protocol utilizes an OTP or a pictorial code generated by the data key or a transaction processor participating in the dual-device security protocol.

11. The data key of claim 1, wherein the microprocessor is further configured to transmit data stored in the memory to a transaction processor encrypted in PKI, token, or cryptogram format.

12. The data key of claim 1, further comprising a battery providing electric power to the data key to engage in secure transactions through wireless communications without physical connection to another device.

13. The data key of claim 1, further comprising a near-field communication (NFC) antenna operative for wirelessly communicating with an NFC point-of-sale (POS) terminal to engaging in a transaction with the POS terminal.

14. A data key for conducting secure transactions, comprising:
non-volatile solid state memory;
a microprocessor operative for storing encrypted data in the memory;
a data port for communicating data stored in the memory between the data key and a host computer;
wherein the memory, microprocessor, and data port are configured as an integrated unit that is conveniently removable from operative connection with the host computer and portable by a computer user;
wherein the encrypted data stored in the memory comprises personal identification data associated with a registered user of the data key and transaction account data associated with the registered user of the data key; and
wherein the data port comprises a dual-use electrical contact including eight contacts configured for communicating with a chip-and-pin port, and four of the electrical contacts are configured for communicating with a USB port.

15. The data key of claim 14, further comprising a switch and associated light, wherein the microprocessor causes the light to alert a user of a need to touch or press the switch to activate the data key for secure transactions using the encrypted data, and wherein the microprocessor activates the data key to engage in secure transactions using the encrypted data in response to detecting a touch or press of the switch.

16. A system for conducting secure transactions, comprising:
a data key comprising a non-volatile solid state memory, a microprocessor operative for storing encrypted data in the memory, and a data port for communicating data stored in the memory between the data key and a host computer, wherein the memory, microprocessor, and data port are configured as an integrated unit that is conveniently removable from operative connection with the host computer and portable by a computer user, and wherein the encrypted data stored in the memory comprises personal identification data associated with a registered user of the data key and transaction account data associated with the registered user of the data key;
a mobile device registered with the data key;
wherein the microprocessor is further configured to conduct transactions using the encrypted data in the memory through a dual-device security protocol involving a mobile device registered for use with the data key; and
a switch and associated light, wherein the microprocessor causes the light to alert a user of a need to touch or press the switch to activate the data key for secure transactions using the encrypted data, and wherein the microprocessor activates the data key to engage in secure transactions using the encrypted data in response to detecting a touch or press of the switch.

17. The system of claim 16, further comprising an online server operative for participating in the dual-device security protocol by receiving transaction authorization data from the data key via a first communication medium and transmitting the transaction authorization data to the mobile device via a second communication medium.

18. The system of claim 17, wherein the first communication medium comprises the Internet and the second communication medium comprises a telecommunications network.

19. The system of claim 16, further comprising a near-field communication receiver for wirelessly receiving financial transaction data from an NFC-enabled transaction device.

20. The system of claim 19, wherein the data port comprises a dual-use electrical contact including eight contacts configured for communicating with a chip-and-pin port, and four of the electrical contacts are configured for communicating with a USB port.

* * * * *